United States Patent
Donaldson

(10) Patent No.: US 9,752,422 B2
(45) Date of Patent: Sep. 5, 2017

(54) DIRECT ELECTRICAL STEAM GENERATION FOR DOWNHOLE HEAVY OIL STIMULATION

(71) Applicant: A. Burl Donaldson, Albuquerque, NM (US)

(72) Inventor: A. Burl Donaldson, Albuquerque, NM (US)

(73) Assignee: Donaldson Engineering, Inc., Albuquerque, NM (US)

( * ) Notice: Subject to any disclaimer, the term of this patent is extended or adjusted under 35 U.S.C. 154(b) by 232 days.

(21) Appl. No.: 14/532,778

(22) Filed: Nov. 4, 2014

(65) Prior Publication Data

US 2015/0122497 A1     May 7, 2015

Related U.S. Application Data

(60) Provisional application No. 61/899,504, filed on Nov. 4, 2013.

(51) Int. Cl.
*E21B 43/24*     (2006.01)
*E21B 36/00*     (2006.01)

(52) U.S. Cl.
CPC ........ *E21B 43/2401* (2013.01); *E21B 36/006* (2013.01); *E21B 43/24* (2013.01)

(58) Field of Classification Search
None
See application file for complete search history.

(56) References Cited

U.S. PATENT DOCUMENTS

| | | |
|---|---|---|
| 3,420,301 A | 1/1969 | Riley et al. |
| 3,946,809 A | 3/1976 | Hagedorn |
| 4,199,025 A | 4/1980 | Carpenter |
| 4,228,853 A | 10/1980 | Harvey et al. |
| 4,366,860 A | 1/1983 | Donaldson et al. |
| 4,378,846 A | 4/1983 | Brock |
| 4,411,618 A | 10/1983 | Donaldson et al. |
| 4,412,124 A | 10/1983 | Kobayashi |
| 4,463,805 A | 8/1984 | Bingham |
| 4,498,542 A | 2/1985 | Eisenhawer et al. |
| 4,648,835 A | 3/1987 | Eisenhawer et al. |
| 4,783,585 A | 11/1988 | Meshekow |
| 5,142,608 A | 8/1992 | Meshekow |
| 5,623,576 A * | 4/1997 | Deans .............. E21B 36/04 166/60 |
| 7,591,309 B2 | 9/2009 | Minnich et al. |
| 8,235,118 B2 | 8/2012 | Schultz et al. |
| 8,371,371 B2 | 2/2013 | Diehl et al. |
| 8,573,292 B2 | 11/2013 | Ware et al. |
| 2007/0102152 A1 | 5/2007 | Forgeron |
| 2008/0017381 A1 | 1/2008 | Baiton |
| 2013/0168093 A1 | 7/2013 | Qu et al. |
| 2013/0213892 A1* | 8/2013 | Henthorne .......... B01D 61/022 210/650 |
| 2014/0166301 A1 | 6/2014 | Corre |

OTHER PUBLICATIONS

"The Difference between Conductivity, TDS and salinity," instrument choice.com.au, retrieved Nov. 4, 2016.*
"Technology of oil and bitumen output stimulation by heat from reactions of downhole Binary Chemical Mixtures (BM)", www.viscos-energy.com, 2013.
Donaldson, "Reflections on a Downhole Steam Generator Program", Society of Petroleum Engineers, Inc., 1997.
Herron, "In Situ Hydrovisbreaking", Sep. 2003.
Kanaan, "Direct Electric Heating of Electrolyte Solutions", May 2010.
Shipley, "The Alternating Current Electrolysis of Water", Canadian Journal of Research, 1929, 305-358.
Stapp, "In Situ Hydrogenation", Fossil Energy, Dec. 1989.
Western Research Institute, "Development and Demonstration of a Practical Electric Downhole Steam Generator for Thermal Recovery of Heavy Oil and Tar", http://uwdigital.uwyo.edu/islandora/object/wyu%3A11367, Mar. 1993.

* cited by examiner

*Primary Examiner* — Angela M DiTrani
(74) *Attorney, Agent, or Firm* — Jeffrey D. Myers; Justin R. Jackson; Peacock Myers, P.C.

(57) ABSTRACT

A method of downhole steam generation comprising determining a desired level of electrical conductivity for water to be converted to steam in a downhole location, acquiring a main feedwater supply, wherein water of the main feedwater supply has an electrical conductivity lower or higher than the desired level, mixing water of the main feedwater supply with water from one or more sidestreams to generate a resultant stream with an electrical conductivity of about the desired level, pumping the resultant stream to the downhole location, and passing an electrical current through the resultant stream in the downhole location to generate steam.

23 Claims, 2 Drawing Sheets

DIRECT ELECTRICAL STEAM GENERATION FOR DOWNHOLE HEAVY OIL STIMULATION

CROSS-REFERENCE TO RELATED APPLICATIONS

This application claims priority to and the benefit of the filing of U.S. Provisional Patent Application Ser. No. 61/899,504, entitled "Direct Electrical Steam Generation for Downhole Heavy Oil Stimulation", filed on Nov. 4, 2013, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to the generation of steam by direct electric heating of water containing dissolved or ionic solids. The immediate application is for generation of steam downhole in an oil bearing formation for improved production of heavy oil.

Description of Related Art

While many heavy oil formations can be stimulated to production by steam delivered from conventional surface boilers to the formation via injection tubing, there are other formations which are either too deep, or of such poor injectivity that much of the energy content of the steam is lost during delivery, and the result is poor or no stimulation. In an effort to address this problem, substantial research effort has gone into the development of steam generation downhole. For example, the U.S. Department of Energy ("DOE") Project DEEP STEAM demonstrated operation of a downhole combustion type steam generator which utilized high pressure air, high pressure diesel and high pressure water as feedstreams to the downhole combustor and direct contact steam generator. Patents resulting from this effort can be found in U.S. Pat. Nos. 4,366,860 and 4,411,618.

A subsequent, commercial effort by many of the technologists from this initial work refined the technique to include field produced natural gas as the fuel for the downhole steam generator. Patents related to this effort can be found in U.S. Pat. Nos. 4,498,542 and 4,648,835. These efforts focused on the use of low cost fuel as an energy source, but the delivery of these feeds to a downhole steam generator, and control of these feeds from surface metering and control methods, resulted in a complicated system subject to difficulty of installation, difficulty with monitoring and control and associated high costs of materials and labor. A later reflection by one of the lead engineers for this effort can be found in "Reflections on a Downhole Steam Generator Development Program", A. B. Donaldson, Paper 38276, presented at the Western Regional Meeting of SPE in Long Beach, Calif., Jun. 25-27, 1997, where the suggestion was made that perhaps an electric downhole steam generator could avoid many of the observed shortcomings of a combustion style downhole steam generator. The author went on to point out that if the steam generator is used primarily for pre-treatment of the well before placing on steam drive, i.e., huff-and-puff, then the cost of the energy is not an overriding consideration, whereas simplicity and ease of installation are paramount. The typical cost of electricity is around three times that of natural gas on an energy basis, because heat engines to drive generators have a thermal efficiency of only around 35%-40%. However, during off-peak periods, electric energy may be much cheaper because power generating companies desire to keep generating assets base-loaded. The simplicity of an electric steam generator is such that it can easily be shut down and restarted to enjoy discounted off-peak electric rates. And with this possible cyclic operation, injection of other fluids, e.g., water or air, may produce enhanced oil production owing to a symbiotic effect; these suggested alternating cycles are not novel, except in association with a downhole electric steam generator. For example, water injection can moderate formation temperatures in the circumstance that the equilibrium steam temperature in association with the required injection pressure, exceeds the temperature which is needed for adequate viscosity reduction. Water injection will assist in advancing the heated zone farther into the oil formation while the generator is on standby. Air injection can initiate cyclic combustion which can be controlled by subsequent daily steam injection, thus minimizing channeling, which is a known problem with in-situ combustion projects.

The utilization of direct electric heating of water for downhole steam generation was disclosed in U.S. Pat. No. 4,783,585 based on a two electrode design, and the general strategy has been otherwise mentioned, including in U.S. Pat. No. 5,623,576. A later Master's Thesis ("Direct Electric Heating of Electrolyte Solutions", by Ahmed Mijbel Kanaan, M S Thesis, New Mexico State University, 2010) demonstrated a continuous flow steam generator utilizing 240 vac power, with two electrode plus neutral design and using a typical domestic water supply. This research indicated that water hardness can beneficially be removed by a conventional water softener before passing into a steam generator.

BRIEF SUMMARY OF THE INVENTION

The present invention is of a method of downhole steam generation, comprising: determining a desired level of electrical conductivity for water to be converted to steam in a downhole location; acquiring a main feedwater supply, wherein water of the main feedwater supply has an electrical conductivity lower or higher than the desired level; mixing water of the main feedwater supply with water from one or more sidestreams to generate a resultant stream with an electrical conductivity of about the desired level; pumping the resultant stream to the downhole location; and passing an electrical current through the resultant stream in the downhole location to generate steam. One or more of the sidestreams can comprise one or both of carbonic acid and sodium bi-sulfite, can comprise produced water (preferably first passed through a water softener), and can be passed through a reverse osmosis membrane. Sidestreams are chosen based on whether water of the main feedwater supply has an electrical conductivity higher or lower than the desired level. Flow rate is varied based on energy input to the resultant stream. The steam generated has a mass fraction of vapor to total water of 40% to 80%. One or more electrodes are employed with outlets of the resultant stream spaced therebetween.

The present invention is also of a method of downhole steam generation, comprising: determining a desired level of electrical conductivity for water to be converted to steam in a downhole location; acquiring a main feedwater supply, wherein water of the main feedwater supply has an electrical conductivity lower than the desired level; mixing water of the main feedwater supply with water from one or more sidestreams having an electrical conductivity higher than the desired level to generate a resultant stream with an electrical conductivity of about the desired level; pumping the resultant stream to the downhole location; and passing an electrical current through the resultant stream in the downhole location to generate steam. One or more of the sidestreams can comprise one or both of carbonic acid and sodium bi-sulfite and can comprise produced water (preferably passed through a water softener). Flow rate is varied based on energy input to the resultant stream. The steam generated has a mass fraction of vapor to total water of 40% to 80%. One or more electrodes are employed with outlets of the resultant stream spaced therebetween.

The present invention is further of a method of downhole steam generation, comprising: determining a desired level of electrical conductivity for water to be converted to steam in a downhole location; acquiring a main feedwater supply, wherein water of the main feedwater supply has an electrical conductivity higher than the desired level; mixing water of the main feedwater supply with water from one or more sidestreams having an electrical conductivity lower than the desired level to generate a resultant stream with an electrical conductivity of about the desired level; pumping the resultant stream to the downhole location; and passing an electrical current through the resultant stream in the downhole location to generate steam. One or more of the sidestreams is preferably first passed through a reverse osmosis membrane. The flow rate is varied based on energy input to the resultant stream. The steam generated has a mass fraction of vapor to total water of 40% to 80%. One or more electrodes are employed with outlets of the resultant stream spaced therebetween.

The invention is yet further of a method of producing downhole hydrogen and oxygen comprising utilizing electrolysis of water, providing oxidation of in-situ oil to produce heat and carbon dioxide, and hydrovisbreaking with hydrogen to reduce oil viscosity.

The invention is still further of a method of producing downhole hydrogen and oxygen comprising utilizing electrolysis of water and including combustion internal to the method, thereby increasing quality of steam injected downhole.

The invention is additionally of a method producing downhole steam comprising providing a downhole sucker rod pump and an electric steam generator, whereby a workover rig is not required when huff-and-puff is used for sequential stimulation and production.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
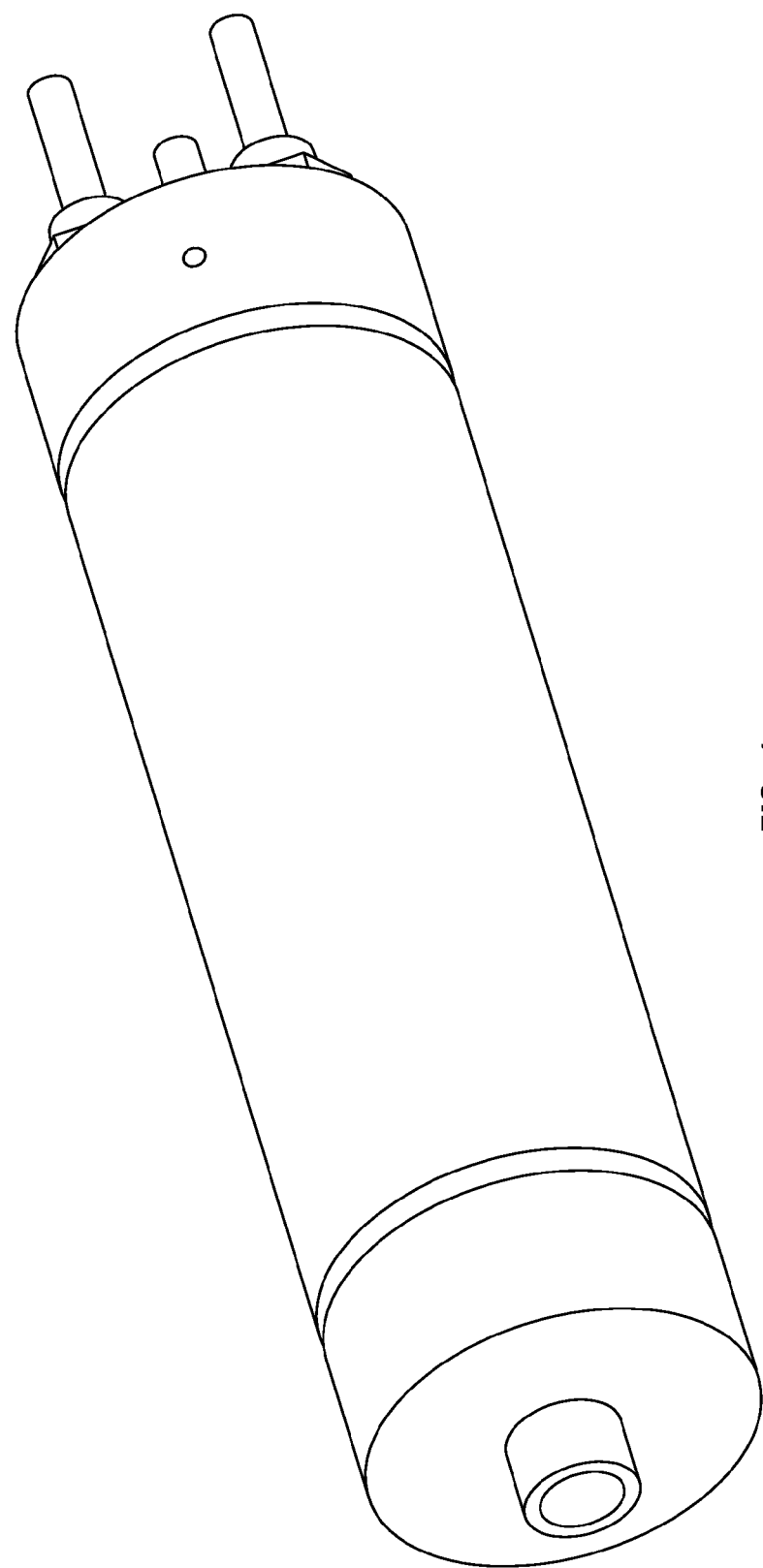
FIG. 1 is an un-exploded view of an exemplary assembly of a downhole device useful in accomplishing the invention.
Figure 2:
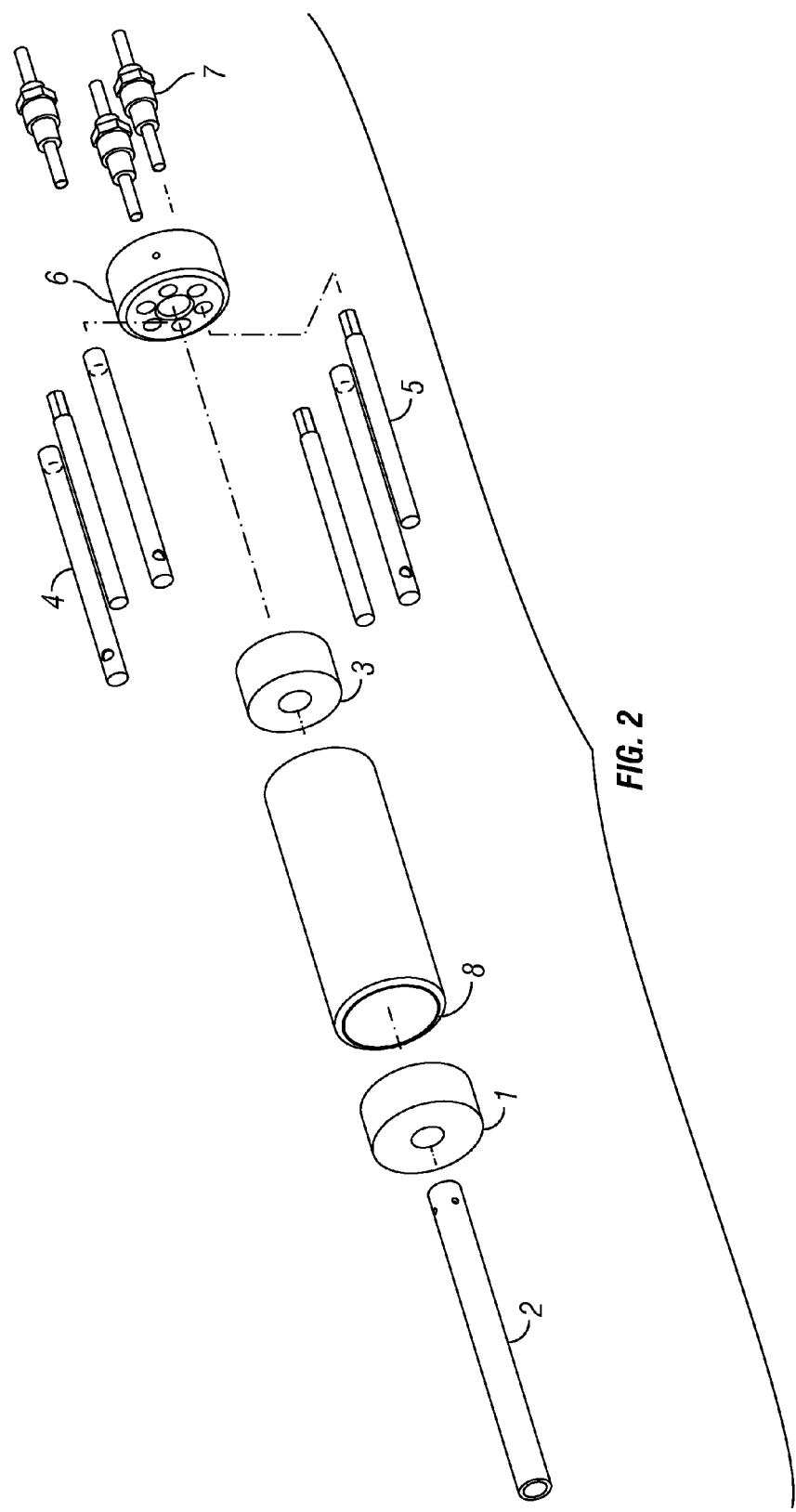
FIG. 2 is an exploded view.

Steam is the traditional method of conveying heat into an oil formation, and the objective of raising formation temperature is a reduction in viscosity of heavy oil whose production is inhibited because of its high viscosity. Steam is a preferred heat transfer medium for various reasons, including: low cost, non-toxic, available, and its ability to carry substantial energy via latent heat of vaporization at relatively low temperatures. If the oil bearing formation is shallow, i.e., less that 2500', and the "injectivity" of the formation is high, then output of traditional surface steam generators can be conveyed downhole without excessive heat loss. However, for deep heavy oil formations, or for formations with low injectivity, then delivery string heat losses dominate the process with a resultant low efficiency.

The basis for the method to be described relates to water electrical conductivity containing some level of ionic contaminants (electrolyte solution), which will result in ohmic heating when an electric field is applied across the water. Since high voltages can be used to deliver substantial energy over long distances with minimum loss and minimum electrical conductor size, this method provides for delivering energy into deep formations. And since output of the downhole electric steam generator can be adapted to low or high output, then "tight" formations can also be stimulated by reduction of energy and volume of steam which is injected into the formation. The main body of this configuration comprises a downhole chamber where water is passed through an electric field, and by tailoring water flow rate to rate of applied electric power, then high pressure steam can be generated, which will then pass into the oil bearing formation. The water flow rate can be set so that steam quality of 60-80% (mass fraction of vapor to total water) is generated. By not taking the steam quality to 100%, the dissolved solids will remain in the liquid phase and will not lead to solids deposition in either the steam generator, or in the formation.

High pressure water from a variable speed surface pump will deliver water to the downhole steam generator via either continuous tubing, or rigid jointed tubing. Electrical power, preferably at high voltage and presumably 3 phase, will be delivered to the steam generator via insulated electrical conductors. The electrical conductors will be mechanically bound to the water delivery tube for proper tensioning and loading. Both the water tubing and delivery of high voltage into a well are standard technologies. The former of these can be realized by using either jointed tubing which is made up at the wellhead and lowered into the well by workover rig, or via a coiled tubing truck. The latter of these relates to high power submersible pumps which utilize high voltage, such as 4160 vac and are rated at up to 500 kW or perhaps even higher.

The present invention is of a method of and apparatus for generating steam, particularly in downhole applications. Variables which can be utilized by the engineer for proper design of any particular steam generator of the invention include: TDS of the water (alteration can be made; method to be discussed later), surface area of the electrodes, separation of the electrodes from neutral, and water delivery rate. A traditional water softener can be used to remove scaling minerals from the feedwater. The feedwater TDS and electrical conductivity will generally be known before the steam generator is designed for a particular location. However, current technology has the means available wherein water electrical conductivity can be tailored to requirements by passing a feedwater sidestream through a reverse osmosis ("RO") membrane (or other mechanism to control feedwater electrical conductivity) which can remove essentially all dissolved minerals. Then by blending this high quality stream with the main feedwater supply, a resultant electrical conductivity can be specified. Alternately, if the feedwater conductivity is too low, then a sidestream which increases the water TDS and conductivity, can be injected in order to increase the output capacity of the steam generator. These sidestreams may include sodium bi-sulfite (or carbonic acid or other ion producing compound with desirable properties) which acts as an oxygen scavenger (for applications below approximately 1000 psi injection pressure), or can include produced water which frequently has a higher TDS loading than surface or ground water, or might include carbonic acid, which upon heating, will liberate carbon dioxide, which is known to be beneficial in oil recovery. If a produced water sidesteam is used, it should be introduced ahead of the water softener, in order to remove any scaling minerals. In order to precisely control the electrical conductivity of the feedwater and the steam generator output, an inline conductivity meter can be included in the feedwater supply, preferably after the side stream and main streams are blended, which is monitored by the same PLC that controls the high pressure feedwater pump. The controller or PLC, will then utilize either a flow control valve on the sidestream, or the pumping rate on a dosing pump, in order to match the steam generator load to the desired level. In preliminary design of the steam generator, the increase in electrical conductivity of water with increase in temperature is recognized. However the relationship is known to become less pronounced at higher temperatures, e.g., 500° F. Since the PLC will be monitoring electric power to the generator, and be either increasing or decreasing feedwater electrical conductivity so that target power is maintained, then the water conductivity vs temperature relationship does not need to be precisely known. The PLC can compensate for low electrical conductivity of cold water at startup by reducing the water supply rate, and then as conductivity increases, the PLC can raise the water supply rate as the operating temperature of the steam generator stabilizes. The target electric power will be determined based on electric supply capability of equipment. Another adjustment which can be made in light of the PLC capability to adjust feedwater electric conductivity, is the reduction in steam injection rate if a pressure set point has been established by the oil field operator. In other words, injection pressure is directly related to injection rate. So by reducing injection rate, then injection pressure can be stabilized to match a preset upper pressure limit.

For illustration purposes, consider that power is 4160 vac, 3 phase, and Y connected. Then each of three legs to neutral can be used for resistive heating. Refer to the attached figures for description of an embodiment of the invention that is suitable for downhole installation. Consider an outer cylinder or casing 8 with a top closure or flange 6 and bottom closure or flange 1. Into the top closure, water is delivered to a central port (not shown in illustration) and externally surrounding this port are three hot posts which deliver electric power into the generator through high pressure bulkhead connectors 7, located at about 120 degrees apart. A smaller diameter outlet pipe 2 will be situated in the center of the generator and this pipe will be open at the top just below the top closure so that steam can exit the generator via this outlet pipe. Hence, an annulus will be formed inside the generator between the outer cylinder and the inner pipe. Inside the generator annulus, three electrodes 5, are connected to the bulkhead connectors and these are of a predetermined length based on projected electrical conductivity of water and desired power output of the generator. Water is delivered to the bottom of the generator via three internal conduits or pipes 4, spaced about 120 degrees apart, and equidistant between each of the electrodes. These water passage tubes access the central water supply through appropriate porting in the top closure. Water will exit these tubes through a side opening near the plugged bottom, thus creating a circulating flow tangential to the center line of the steam generator. A machinable high temperature ceramic insulator 3, will be appropriately ported to securely hold the bottom of the water tubes and the bottom of the electrodes in position between the outer cylinder and the outlet pipe. The outer cylinder, the outlet pipe and the three water tubes will all be connected to electrical neutral. Hence, there will be an electric field created between each electrode, and the surrounding neutrally connected surfaces. As swirling water rises from the bottom of the generator through this electric field, heating of the electrically conducting water will occur. The generated steam in the form of distributed liquid and vapor will rise outside of the outlet pipe to its top and reverse direction to exit out the bottom of the outlet pipe as a water-steam mixture, thus assuring that the electrodes remain immersed in rising liquid and vapor water. From the bottom of the outlet pipe, steam will pass into the well perforations and formation. The outer diameter cylinder will be of such size that it can be installed in conventional oil well casing. For example, a cylinder outer diameter of 4½" can easily be install inside a casing which is nominal 7" diameter. A controller, or PLC, will monitor all functions and control water delivery rate based on monitored electric power to provide the desired steam quality. It will also monitor any voltage difference between electric ground and earth ground and automatically shut off power if any substantial difference is detected, and thus act as a GFI. Any other abnormal parameters, e.g., interruption of water supply, or steam pressure and steam temperature outside the saturation envelop, will also trigger a shut-down. There will be a manual start-up over-ride on pressure/temperature data to bring system up to steady operation. The design will be self-regulating in the sense that as vapor is produced which has zero electrical conductivity, the TDS concentration in the liquid phase will increase, leading to essentially flat overall electrical conductivity during water vaporization. In other words, the power draw will not increase and result in excessive load on the electric supply. And if the annulus between the casing and outlet pipe is completely vapor, then no electric current will flow. With sufficient water flow through the steam generator, there should be no constraint on orientation so that stimulation of either vertical wells, or horizontal wells is envisioned.

Deep heavy oil or tight formations are the most obvious general application for a downhole electric steam generator. It can be used in either conventional huff-and-puff mode or in steam drive mode if electrical costs can be justified by oil recovery. Or, in the case where off-peak rates are favorable, then the downhole steam generator can be operated on a daily cycle where it is shut down during peak rate periods. If the steam generator is cycled, then an advantage to generating steam downhole is that the casing is not subjected to cyclic thermal stresses, which frequently leads to casing failure. Whether the well is idle, or is stimulated by alternating air, water or gas injection, depends on opinion of the field operator, the formation responsiveness to these various stimuli, and the availability of alternative injection fluid choices. However, there are some special circumstances where an electric downhole steam generator may be ideally and uniquely suited. For example, in northern oilfields where permafrost exists, the casing is cemented to barren zones which do not have high temperature integrity. Hence, injection of surface generated steam is not an option, since the casing cementing to the formation will expectedly fail. However, if the steam is generated downhole, then this situation is avoided. Or, on off-shore platforms, there is generally abundant electric generation capability. However, platform space is highly valuable. A downhole electric steam generator will not uptake significant additional platform space, whereas a conventional boiler will occupy significant space, and poses some level of hazard to personnel on the platform. A downhole electric steam generator configuration can be provided with the invention such that the steam generator and a type of downhole pump can both be installed simultaneously in a well. Then a workover rig would not be required on each huff and puff cycle. For example, if a downhole packer is not required by regulation, then with separate coil tubing installation for the steam generator and pump, there is sufficient side clearance around the electric steam generator for production tubing and separate electrical conductors to pass below to the pump, into liquid perhaps 20' below the well perforations. Then the steam generator output will pass directly into the perforations and not disturb the liquid column above the submersible pump, which will prevent heat from reaching the pump. The submersible pump conductors passing the generator output need to be provided with high temperature insulation so that the steam temperature would not compromise the electrical insulation. As an alternative when a downhole packer is not required, then tubing passing around the electric steam generator can extend into the liquid contained in the rat hole below the perforations. Then air or gas can be injected into the annulus to facilitate a "gas lift" production technique. Alternately, if a downhole packer is required, then by design, a tubing with sucker rod can be installed which extends through the steam generator to a sucker rod pump located below the perforations, where again, liquid will protect the pump seals from heat from the steam generator. In this case, the water can be supplied to the steam generator via small diameter tubing ~O(0.75" o.d.) with porting into the side of the top flange. In operation, produced fluids can flow upward through the center of the steam generator but not be directly connected to the steam generator. The production tubing together with the outer case of the steam generator, will then comprise the electrical neutral. It is anticipated that this configuration will be installed as an integral unit with perhaps a tension set packer below the steam generator but above the sucker rod pump. If the production tubing is 2⅜" o.d., then steam can be transported through the packer in an annulus between 3½" o.d. tubing, and the 2⅜ o.d. tubing, and then flow out through ports adjacent to the casing perforations.

Based on the ability to adjust the electrical conductivity of water, a current density can be obtained to achieve a desired level of water electrolysis, i.e., see Shirley, "The Alternating Current Electrolysis of Water", Can. J. Research, Vol. 1, pp 305-358 (1929). Electrolysis of water will produce free hydrogen and free oxygen. In thermal stimulation of heavy oil, these gases can be utilized in beneficial ways. By design of the electric steam generator, a cavity can be incorporated with the design, in which hydrogen, oxygen and water vapor will collect and can be ignited in minimal presence of liquid water which might quench the oxidation process. Because the flammability limits of hydrogen and oxygen, with water vapor dilution, are very wide, then combustion stability can be expected. This added thermal energy can be used to enhance the state of the two phase steam by increasing steam quality. However, left unreacted, hydrogen and oxygen can have beneficial effects when injected into the oil bearing formation, along with high temperature steam. Oxygen will react with oil to release combustion energy and produce carbon dioxide. Because steam will be simultaneously injected, then control of the heated zone temperature will avoid coking, and other problems which have been encountered in in-situ combustion for heavy oil recovery. High pressure carbon dioxide will go into solution with the oil in place and thereby reduce viscosity to facilitate production. The hydrogen, injected with high temperature steam, can have the effect of hydrovisbreaking of heavy oil, resulting in an additional lowering of oil viscosity, see for example, NIPER-434 "In-Situ Hydrogenation", report to DOE, by Paul Stapp, December 1989 and Ware, et al., U.S. Pat. No. 8,573,292, and also see: http://www.petroleumequities.com/Statoilseminar.pdf.

Thus, the present invention encompasses the added capability of beneficial utilization of hydrogen and oxygen gas which can be produced by electrolysis of water, when the electrical resistivity of the steam generator feed water can be adjusted to a desired value.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of downhole steam generation, the method comprising the steps of:

determining a desired level of electrical conductivity for water to be converted to steam in a downhole location;

acquiring a main feedwater supply, wherein water of the main feedwater supply has an electrical conductivity lower than the desired level;

mixing water of the main feedwater supply with water from one or more sidestreams having an electrical conductivity higher than the desired level to generate a resultant stream with an electrical conductivity of about the desired level;

pumping the resultant stream to the downhole location; and passing an electrical current through the resultant stream in the downhole location to generate steam.

2. The method of claim 1 wherein one or more of the sidestreams comprises one or more of the group consisting of carbonic acid and sodium bi-sulfite.

3. The method of claim 1 wherein one or more of the sidestreams comprises produced water.

4. The method of claim 3 wherein the produced water is first passed through a water softener.

5. The method of claim 1 wherein the acquiring step comprises varying a flow rate based on energy input to the resultant stream.

6. The method of claim 1 wherein the steam generated has a mass fraction of vapor to total water of 40% to 80%.

7. The method of claim 1 wherein the passing step comprises employing one or more electrodes with outlets of the resultant stream spaced therebetween.

8. A method of downhole steam generation, the method comprising the steps of:
- determining a desired level of electrical conductivity for water to be converted to steam in a downhole location, the desired level comprising a conductivity that results in a target power level being maintained in the downhole location;
- acquiring a main feedwater supply, wherein water of the main feedwater supply has an electrical conductivity higher than the desired level;
- mixing water of the main feedwater supply with water from one or more sidestreams having an electrical conductivity lower than the desired level and adjusting a flow of the one or more sidestreams based on conductivity of a flow of feedwater to generate a resultant stream with an electrical conductivity of about the desired level;
- pumping the resultant stream to the downhole location; and
- passing an electrical current through the resultant stream in the downhole location to generate steam.

9. The method of claim 8 wherein one or more of the sidestreams is first passed through a reverse osmosis membrane.

10. The method of claim 8 wherein the acquiring step comprises varying a flow rate based on energy input to the resultant stream.

11. The method of claim 8 wherein the steam generated has a mass fraction of vapor to total water of 40% to 80%.

12. The method of claim 8 wherein the passing step comprises employing one or more electrodes with outlets of the resultant stream spaced therebetween.

13. The method of claim 8 wherein the target power level is determined based on electrical supply capability of equipment.

14. A method of downhole steam generation, the method comprising the steps of:
- determining a desired level of electrical conductivity for water to be converted to steam in a downhole location, the desired level comprising a conductivity that results in a target power level being maintained in the downhole location;
- acquiring a main feedwater supply, wherein water of the main feedwater supply has an electrical conductivity lower or higher than the desired level;
- adjusting a flow of one or more sidestreams based on conductivity of a flow of feedwater;
- mixing water of the main feedwater supply with water from the one or more sidestreams to generate a resultant stream with an electrical conductivity of about the desired level;
- pumping the resultant stream to the downhole location; and
- passing an electrical current through the resultant stream in the downhole location to generate steam.

15. The method of claim 14 wherein one or more of the sidestreams comprises one or more of the group consisting of carbonic acid and sodium bi-sulfite.

16. The method of claim 14 wherein one or more of the sidestreams comprises produced water.

17. The method of claim 16 wherein the produced water is first passed through a water softener.

18. The method of claim 14 wherein one or more of the sidestreams is first passed through a reverse osmosis membrane.

19. The method of claim 14 wherein sidestreams are chosen based on whether water of the main feedwater supply has an electrical conductivity higher or lower than the desired level.

20. The method of claim 14 wherein the acquiring step comprises varying a flow rate based on energy input to the resultant stream.

21. The method of claim 14 wherein the steam generated has a mass fraction of vapor to total water of 40% to 80%.

22. The method of claim 14 wherein the passing step comprises employing one or more electrodes with outlets of the resultant stream spaced therebetween.

23. The method of claim 14 wherein the target power level is determined based on electrical supply capability of equipment.

* * * * *

UNITED STATES PATENT AND TRADEMARK OFFICE
CERTIFICATE OF CORRECTION

PATENT NO. : 9,752,422 B2
APPLICATION NO. : 14/532778
DATED : September 5, 2017
INVENTOR(S) : A. Burl Donaldson It is certified that error appears in the above-identified patent and that said Letters Patent is hereby corrected as shown below:

In the Claims

Column 8, Line 54, cancel the text beginning with "1. A method of downhole steam generation," to and ending "to generate steam." in Column 9, Line 2, and insert the following claim:
--1. A method of downhole steam generation, the method comprising the steps of:
 determining a desired level of electrical conductivity for water to be converted to steam in a downhole location, the desired level comprising a conductivity that results in a target power level being maintained in the downhole location;
 acquiring a main feedwater supply, wherein the water of the main feedwater supply has an electrical conductivity lower than the desired level;
 mixing water of the main feedwater supply with water from one or more sidestreams having an electrical conductivity higher than the desired level and adjusting a flow of the one or more sidestreams based on conductivity of a flow of feedwater to generate a resultant stream with an electrical conductivity of about the desired level;
 pumping the resultant stream to the downhole location; and
 passing an electrical current through the resultant stream in the downhole location to generate steam.--

Signed and Sealed this
Second Day of October, 2018

Andrei Iancu
*Director of the United States Patent and Trademark Office*